(12) United States Patent
Choi et al.

(10) Patent No.: US 10,300,552 B2
(45) Date of Patent: May 28, 2019

(54) ONE-SIDE SPOT WELDING DEVICE (71) Applicants: HYUNDAI MOTOR COMPANY, Seoul (KR); KIA MOTORS CORPORATION, Seoul (KR)

(72) Inventors: Jungnam Choi, Seongnam-si (KR); Sung Dae Lim, Gunpo-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 239 days.

(21) Appl. No.: 15/597,542

(22) Filed: May 17, 2017

(65) Prior Publication Data

US 2018/0161912 A1  Jun. 14, 2018

(30) Foreign Application Priority Data

Dec. 14, 2016 (KR) ......................... 10-2016-0170810

(51) Int. Cl.
  *B23K 11/10* (2006.01)
  *B23K 11/11* (2006.01)
  *B23K 11/00* (2006.01)
  *B23K 11/30* (2006.01)
  *B23K 101/00* (2006.01)

(52) U.S. Cl.
  CPC .......... *B23K 11/11* (2013.01); *B23K 11/0026* (2013.01); *B23K 11/3081* (2013.01); *B23K 2101/006* (2018.08)

(58) Field of Classification Search
  CPC .............. B23K 11/11; B23K 2101/006; B23K 11/0026; B23K 11/3081

USPC ........................ 219/86.9, 86.25, 86.21, 86.24
See application file for complete search history.

(56) References Cited

U.S. PATENT DOCUMENTS

| 1,976,552 | A | * | 10/1934 | Friesen | ................... | B23K 11/24 |
| | | | | | | 219/86.21 |
| 2,272,968 | A | * | 2/1942 | Dyer | ...................... | B23K 11/31 |
| | | | | | | 219/128 |
| 2,683,791 | A | * | 7/1954 | Ruehlemann | ............ | B23K 9/28 |
| | | | | | | 219/124.02 |

(Continued)

FOREIGN PATENT DOCUMENTS

| KR | 10-1989-0003100 B1 | 8/1989 |
| KR | 10-1995-0011880 A | 5/1995 |
| KR | 10-1997-0011420 A | 3/1997 |

*Primary Examiner* — Umashankar Venkatesan
(74) *Attorney, Agent, or Firm* — McDonnell Boehnen Hulbert & Berghoff LLP (57) ABSTRACT

A one-side spot welding device includes a base which is formed in a cylindrical shape, a welding head and a welding tip. The base has a push rod operable in an upward and a downward direction with respect to the base and has a slide groove in an upper inner circumferential surface thereof. The welding head is installed at an upper side of the base so as to be slidable in a radial direction and equally divided in a circumferential direction so as to include a plurality of unit welding heads in close contact with one another. The unit welding heads are capable of being spaced apart from one another in the radial direction by the push rod. The welding tip is formed in a cylindrical shape so as to be configured at an outer circumference of the base, operates in an upward and a downward direction and is capable of applying welding electric current to the welding head.

16 Claims, 11 Drawing Sheets (56) References Cited

U.S. PATENT DOCUMENTS

| | | | | |
|---|---|---|---|---|
| 3,322,124 A | * | 5/1967 | Ireland | A61B 17/50 |
| | | | | 219/234 |
| 4,484,055 A | * | 11/1984 | Haines | B23K 9/007 |
| | | | | 219/124.01 |
| 4,794,221 A | * | 12/1988 | Takabe | B23K 11/3072 |
| | | | | 219/86.1 |
| 4,910,376 A | * | 3/1990 | Riley | B23K 11/30 |
| | | | | 219/119 |
| 5,705,784 A | * | 1/1998 | Aoyama | B23K 11/004 |
| | | | | 219/119 |
| 2007/0007253 A1 | * | 1/2007 | Wang | B23K 11/115 |
| | | | | 219/86.25 |
| 2008/0190899 A1 | * | 8/2008 | Sugahara | B23K 11/11 |
| | | | | 219/86.25 |
| 2009/0217507 A1 | * | 9/2009 | Frank | B21J 15/041 |
| | | | | 29/525.06 |
| 2018/0056436 A1 | * | 3/2018 | Thomas | B23K 20/128 |

* cited by examiner

ONE-SIDE SPOT WELDING DEVICE

CROSS-REFERENCE TO RELATED APPLICATION

This application claims priority to and the benefit of Korean Patent Application No. 10-2016-0170810 filed in the Korean Intellectual Property Office on Dec. 14, 2016, the entire contents of which are incorporated herein by reference.

BACKGROUND OF THE DISCLOSURE

(a) Field of the Disclosure

The present disclosure relates to a one-side spot welding device, and more particularly, to a one-side spot welding device for joining a vehicle body panel having a closed cross section by one-side spot welding.

(b) Description of the Related Art

In general, in a welding line for vehicles, home appliances, and the like, spot welding, which is resistance spot welding that improves efficiency, is used.

In particular, spot welding is essentially required in a mass production line that requires an automation process.

Spot welding is a method of positioning a plurality of panels superimposed between a pair of welding electrodes, and joining the plurality of panels by applying electric current to the respective welding electrodes in a state in which the plurality of panels is pressed by predetermined pressing force.

However, among the components for a vehicle, there are many components that the welding electrodes cannot easily access due to restrictions to the shapes of the components. In this case, because it is difficult to apply the spot welding, there is an acute need for technical development to solve the problem.

In this regard, recently, one-side spot welding attracts attention.

The one-side spot welding refers to a method that performs welding by using only a single welding electrode. The one-side spot welding is a method of joining the plurality of panels by applying electric current to the single welding electrode and imparting pressure in a state in which a current carrying path is provided through an earthed electrode.

Therefore, the one-side spot welding may be applied even to the welding of the components for a vehicle that the welding electrodes cannot easily access.

However, the one-side spot welding has the following limitations.

That is, it is necessary to ensure pressing force (welding force) to a certain degree or higher in order to form a welding portion. Since the pressing force is imparted by the single welding electrode, there is a problem in that the plurality of panels is easily deformed when the welding is performed.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to provide a one-side spot welding device capable of welding a vehicle body panel, which has a closed cross section and thus cannot be welded by bidirectional spot welding. This is accomplished by imparting pressing force (welding force), forming electrical resistance by applying electric current, and using welding heat produced by the electrical resistance.

An exemplary embodiment of the present disclosure provides a one-side spot welding device including: a base formed in a cylindrical shape, having a push rod operable in an upward and a downward direction with respect to the base, and having a slide groove in an upper inner circumferential surface thereof; a welding head installed at an upper side of the base so as to be slidable in a radial direction, the welding head including a plurality of unit welding heads that are formed by equally dividing the welding head in a circumferential direction and are in close contact with one another, the unit welding heads capable of being spaced apart from one another in the radial direction upon operation of the push rod; and a welding tip formed in a cylindrical shape so as to be mounted on a lower outer circumferential surface of the base and capable of applying welding electric current to the welding head.

A cam driving surface has a circular truncated conical shape and formed at an upper end portion of the push rod.

Each of the unit welding heads may be formed with a cam surface having an inclined curved surface at an inner surface, which is in contact with the cam driving surface, so as to perform a cam operation with respect to the cam driving surface.

The welding head may be trisected in the circumferential direction, and may have three unit welding heads that are capable of being spaced apart from one another in the radial direction upon operation of the push rod.

A slide protrusion may be formed at a lower side of each of the unit welding heads corresponding to the slide groove. The slide protrusion may be installed to be slidable in the radial direction with respect to the base when the slide protrusion is inserted into the slide groove.

A ring groove may be formed around an outer circumferential surface of the welding head.

A spring ring may be mounted to the ring groove so as to couple the respective unit welding heads.

The push rod and the welding tip may be capable of moving in an upward and a downward direction by operation of a cylinder disposed at a lower side thereof. The cylinder may include: a first chamber that imparts pneumatic pressure to a lower end of the push rod; and a second chamber that is defined by a partition wall outside the first chamber and imparts pneumatic pressure to a lower end of the welding tip.

Another exemplary embodiment of the present disclosure provides a one-side spot welding device including: a welding tip having a through hole formed therein, and capable of applying welding electric current; a base fixed to one side of the through hole inside the welding tip, having a push rod operable to move in an upward and a downward direction at a center thereof and a catching end formed at an upper end portion thereof; and a welding head including a plurality of unit welding heads formed by equally dividing the welding head in a circumferential direction, connected to the catching ends and capable of being radially spread apart upon operation of the push rod.

A fixing end, which protrudes toward a center of the welding tip, may be formed at one side of an inner circumferential surface of the through hole of the welding tip.

A lower end portion of the base may be fixed to the fixing end.

The base may include a plurality of unit bases separated in the circumferential direction, each unit base having an upper end portion on which the catching end is formed.

The welding head may be quadrisected in the circumferential direction, and may include four unit welding heads that are capable of being separated in a radial direction.

A catching groove may be formed at a lower side of each of the unit welding heads, and the catching groove may be hingedly fastened to the catching end through a hinge pin.

A fastening end may be formed at a lower end of each of the unit welding heads so as to be directed toward the push rod. The fastening end may be hingedly fastened to the push rod through a hinge pin so that the unit welding heads are capable of being radially spread apart with respect to the base.

The push rod and the welding tip may be capable of moving in an upward and a downward direction by operation of a cylinder disposed at a lower side thereof. The cylinder may include: a first chamber that imparts pneumatic pressure to a lower end of the push rod; and a second chamber that is defined by a partition wall outside the first chamber, and imparts pneumatic pressure to a lower end of the welding tip.

According to the exemplary embodiment of the present disclosure, it is possible to improve workability by welding a vehicle body panel, which has a closed cross section and thus cannot be welded by bidirectional spot welding, by imparting pressing force, forming electrical resistance by applying electric current, and using welding heat produced by the electrical resistance.

Further, the welding is performed by changing a shape of a nugget by changing shapes and structures of the welding heads and the welding tips. As a result, it is possible to improve welding quality and marketability.

In addition, according to the exemplary embodiments of the present disclosure, a spot welding gun in the related art may be used after applying the bases, the welding heads, and the welding tips to the spot welding gun. As a result, it is possible to reduce costs.

Furthermore, the other effects obtained or expected by the exemplary embodiments of the present disclosure will be directly or implicitly disclosed in the detailed description of the exemplary embodiments of the present disclosure. That is, various effects expected according to the exemplary embodiments of the present disclosure will be disclosed in the detailed description to be described below.

DETAILED DESCRIPTION OF THE EMBODIMENTS

Hereinafter, exemplary embodiments of the present disclosure will be described with reference to the accompanying drawings. However, the drawings illustrated below and the following description relate to one of the various exemplary embodiments for effectively explaining features of the present disclosure. Therefore, the present disclosure is not limited to the following drawings and descriptions.

A one-side spot welding device 1 according to the exemplary embodiments of the present disclosure is used to join, by welding, a plurality of panels that has a closed section and thus cannot be welded by bidirectional spot welding.

Figure 1:
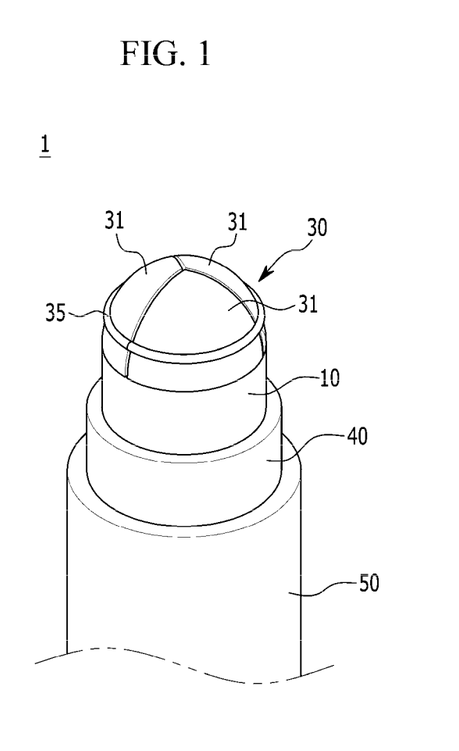
FIGS. 1 and 2 are schematic configuration views of a one-side spot welding device according to one exemplary embodiment of the present disclosure.
Figure 2:
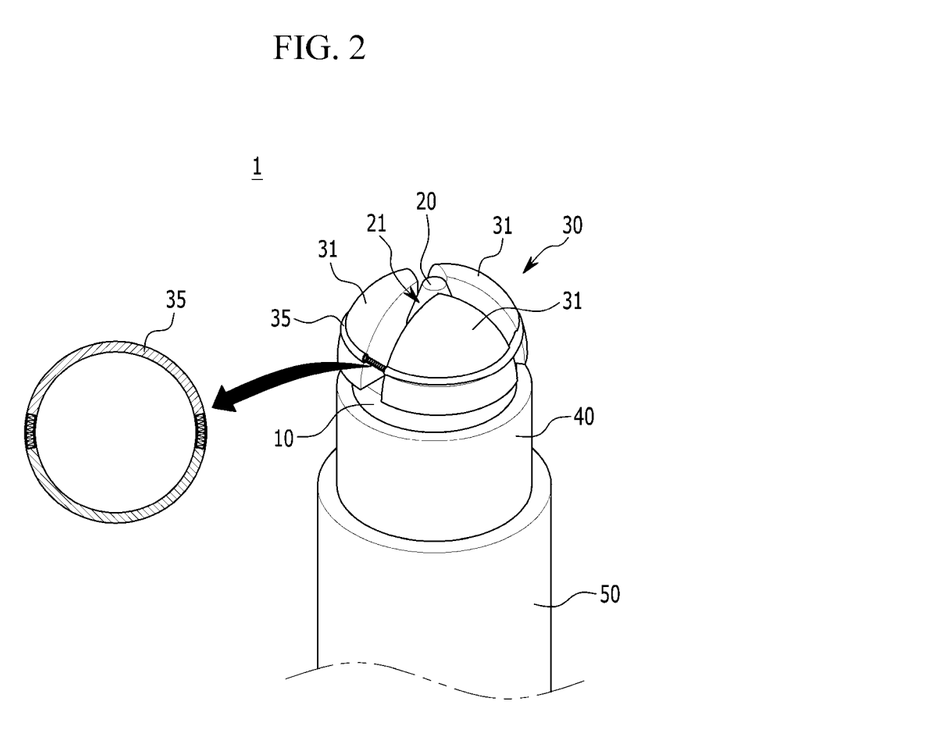
Figure 3A:
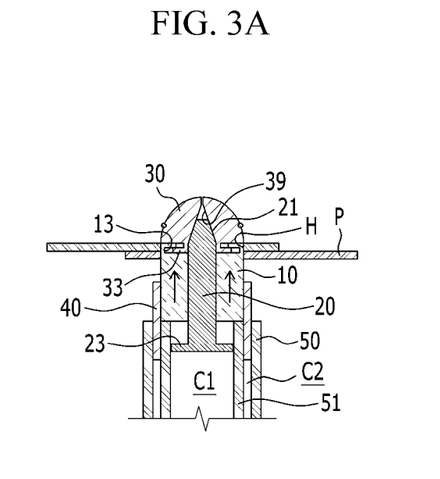
FIGS. 3A to 3C are views illustrating states in which the one-side spot welding device according to one exemplary embodiment of the present disclosure operates.
Figure 3B:
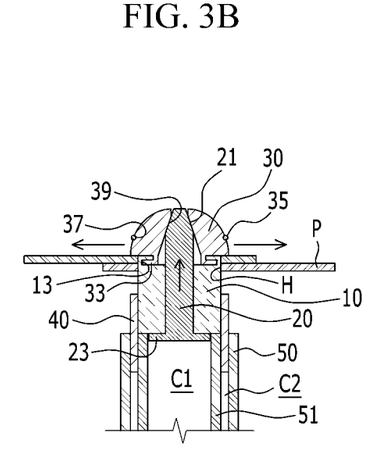
Figure 3C:
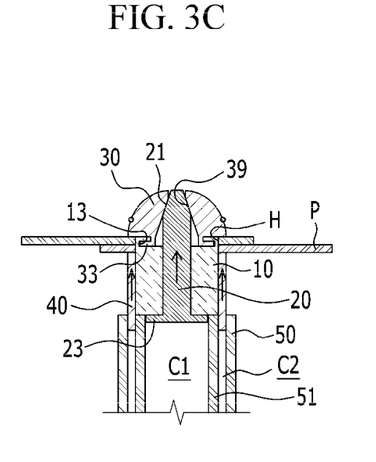
Figure 4:
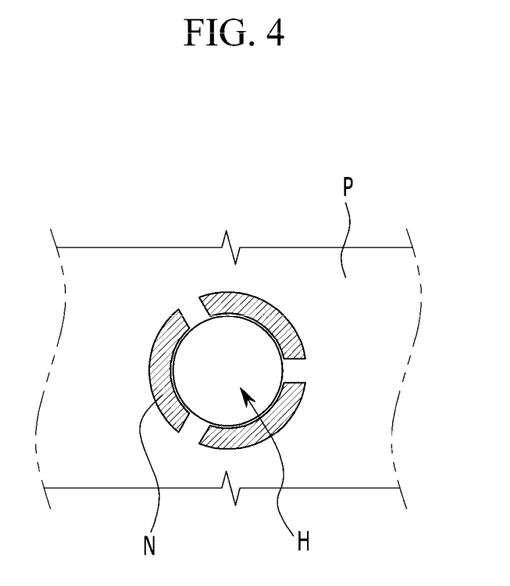
FIG. 4 is a view illustrating a shape of a nugget welded by using the one-side spot welding device according to one exemplary embodiment of the present disclosure.

FIGS. 1 and 2 are schematic configuration views of a one-side spot welding device according to one exemplary embodiment of the present disclosure. FIGS. 3A to 3C are views illustrating states in which the one-side spot welding device according to one exemplary embodiment of the present disclosure operates. FIG. 4 is a view illustrating a shape of a nugget welded by using the one-side spot welding device according to one exemplary embodiment of the present disclosure.

Referring to FIGS. 1 and 2, the one-side spot welding device 1 according to one exemplary embodiment of the present disclosure includes a base 10, a welding head 30, and a welding tip 40.

First, the base 10 is formed in a cylindrical shape.

The push rod 20 is installed in the base 10 so as to be operable to move in an upward or a downward direction.

That is, the push rod 20 may operate selectively in an upward or a downward when the push rod 20 is inserted into a central portion in the base 10.

A cam driving surface 21, which has a circular truncated conical shape, is formed at an upper end portion of the push rod 20.

In addition, a stopper 23 is formed at a lower end portion of the push rod 20.

When the push rod 20 moves upward, the stopper 23 is caught by a lower end of the base 10. As a result, it is possible to prevent the push rod 20 from further moving upward to a predetermined height or higher.

Meanwhile, a slide groove 13 is formed in an upper inner circumferential surface of the base 10.

The push rod 20 may be operated in an upward or a downward direction by a cylinder 50 configured at a lower side thereof.

A configuration of the cylinder 50 will be described in detail below.

Further, the welding head 30 is installed at an upper side of the base 10 so as to be slidable in a radial direction. The welding head 30 is equally divided in a circumferential direction, and thus includes a plurality of unit welding heads 31 in close contact with one another.

Here, the welding head 30 is trisected in the circumferential direction, and has three unit welding heads 31. The heads 31 are spaced apart from one another in the radial direction when the push rod 20 is operated.

In the present exemplary embodiment, the three unit welding heads 31 are described, but the present disclosure is not limited thereto. The number of unit welding heads 31 may be changed.

A slide protrusion 33 is formed at a lower side of each of the unit welding heads 31 so as to correspond to the slide groove 13.

The slide protrusion 33 may be bent outward from a central portion so as to correspond to the slide groove 13 of the base 10.

Here, the slide protrusions 33 are inserted into the slide groove 13 by defining grooves at a predetermined interval between the slide protrusions 33 and the slide groove 13.

That is, the slide protrusions 33 are installed to be slidable in the radial direction when the slide protrusions 33 are inserted into the slide groove 13.

Meanwhile, a ring groove 37 is formed around one side of an outer circumferential surface of the welding head 30.

A spring ring 35 is mounted in the ring groove 37 in order to couple the respective unit welding heads 31.

Here, elastic members having a predetermined length may be formed at both opposite sides of the spring ring 35, thereby imparting elastic force provided from the elastic members to the unit welding heads 31. In another embodiment, the elastic member may be provided only at one side of the spring ring 35.

In the present exemplary embodiment, each of the unit welding heads 31 may be formed with a cam surface 39 formed as an inclined curved surface at an inner surface. The cam surface 39 is in contact with the cam driving surface 21 so as to perform a cam operation with respect to the cam driving surface.

The welding head 30, which is configured as described above, moves in the radial direction by the cam operation when the push rod 20 moves in an upward direction, thereby performing the welding. Further, when the welding is completed and the push rod 20 moves in a downward direction, the unit welding heads 31 may move toward the center of the base and come into close contact with one another by the action of the spring ring 35.

Meanwhile, the welding tip 40 is formed in a cylindrical shape, like the base 10, so as to be mounted on a lower outer circumferential surface of the base 10.

The welding tip 40 operates in an upward or a downward direction by the action of the cylinder 50 provided at the lower side thereof, and may apply welding electric current to the welding head 30.

Here, because a configuration for applying welding electric current to the welding tip 40 is a widely and publicly known configuration, a detailed description thereof will be omitted from the present specification.

In the present exemplary embodiment, the cylinder 50 includes two chambers C1 and C2.

First, the first chamber C1 imparts pneumatic pressure to a lower end of the push rod 20. Further, the second chamber C2 is defined by a partition wall 51 outside the first chamber C1, and imparts pneumatic pressure to a lower end of the welding tip 40.

Therefore, the push rod 20 and the welding tip 40 may operate by moving in an upward or a downward direction by being selectively supplied with pneumatic pressure by the cylinder 50 configured as described above.

Hereinafter, an operation of the one-side spot welding device 1 according to one exemplary embodiment of the present disclosure will be described.

When joining a plurality of panels P by using the one-side spot welding device 1, the welding head 30 is inserted into welding holes H formed in the plurality of panels P, as illustrated in FIG. 3A.

Thereafter, as illustrated in FIG. 3B, the push rod 20 operates and moves in an upward direction toward the welding head 30, thereby sliding the respective unit welding heads 31 in the radial direction.

Therefore, the respective unit welding heads 31 are spread about the push rod 20.

In this case, the push rod 20 is continuously supplied with pneumatic pressure through the first chamber C1 of the cylinder 50.

Thereafter, when pneumatic pressure is supplied into the second chamber C2 of the cylinder 50, the welding tip 40 moves in an upward direction toward the welding head 30, and presses the panels P positioned between the welding head 30 and the welding tip 40, as illustrated in FIG. 3C.

In this case, the welding tip 40 is continuously supplied with pneumatic pressure through the second chamber C2 until the welding work is completed. Therefore, the welding tip 40, together with the welding head 30, may impart pressing force (welding force) to the panels P.

When welding electric current is applied to the welding tip 40, the panels P, which are superimposed and positioned between the welding head 30 and the welding tip 40, are welded to each other by electrical resistance heat.

When the operation of the one-side spot welding device 1 is completed, the panels P are joined together and a nugget N is formed at a position of the panels P at which electric current is applied with the welding tip 40 when the unit welding heads 31 are spread apart, as illustrated in FIG. 4.

The shape of the nugget may be changed in accordance with the designed shapes of the welding head 30 and the welding tip 40.

When the welding work is completed, the supply of pneumatic pressure into the first and second chambers C1 and C2 of the cylinder 50 is stopped, and the push rod 20 and the welding tip 40 are moved in a downward direction.

The unit welding heads 31 then return back to an initial position by the elastic restoring force imparted by the spring ring 35. Therefore, the welding work is completed as an operator or a robot removes the welding head 30 from the welding holes H.

Hereinafter, a one-side spot welding device 100 according to another exemplary embodiment of the present disclosure will be described.

Figure 5:
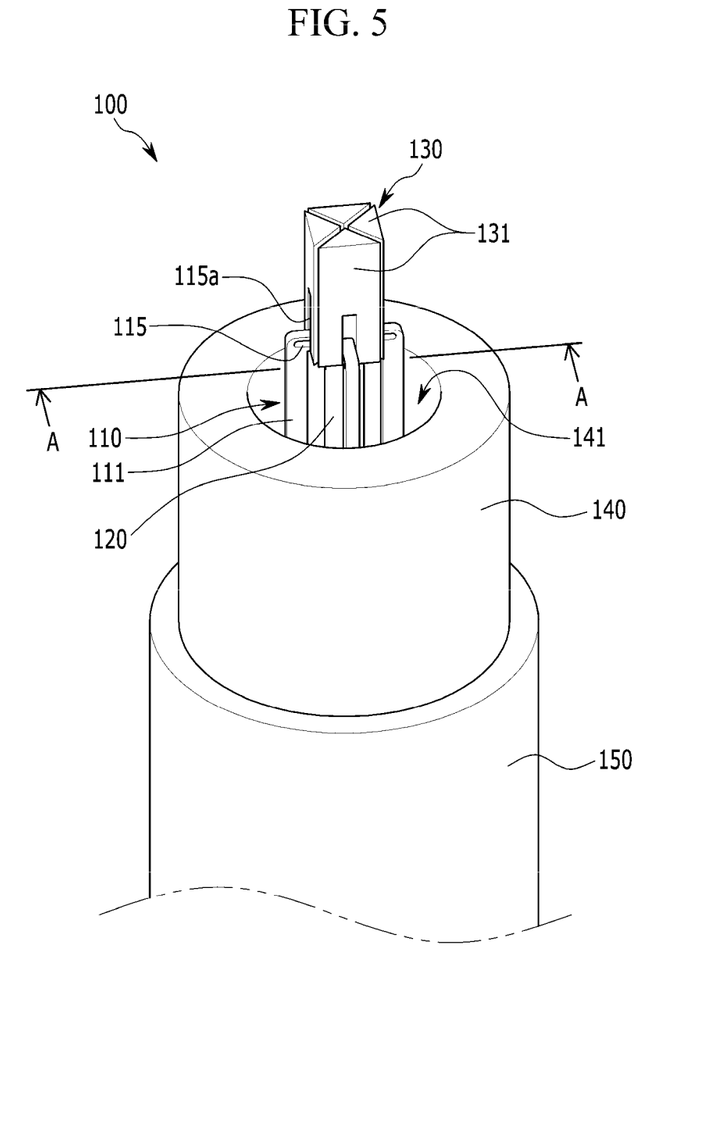
FIG. 5 is a schematic configuration view of a one-side spot welding device according to another exemplary embodiment of the present disclosure.
Figure 6:
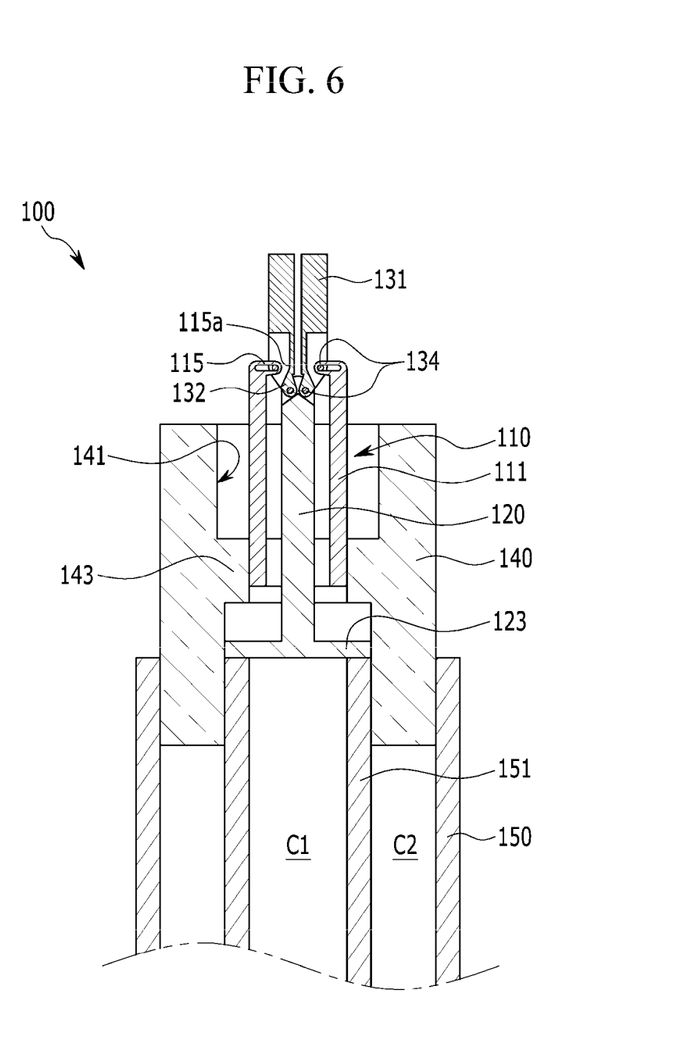
FIG. 6 is a cross-sectional view taken along line A-A of FIG. 5.
Figure 7A:
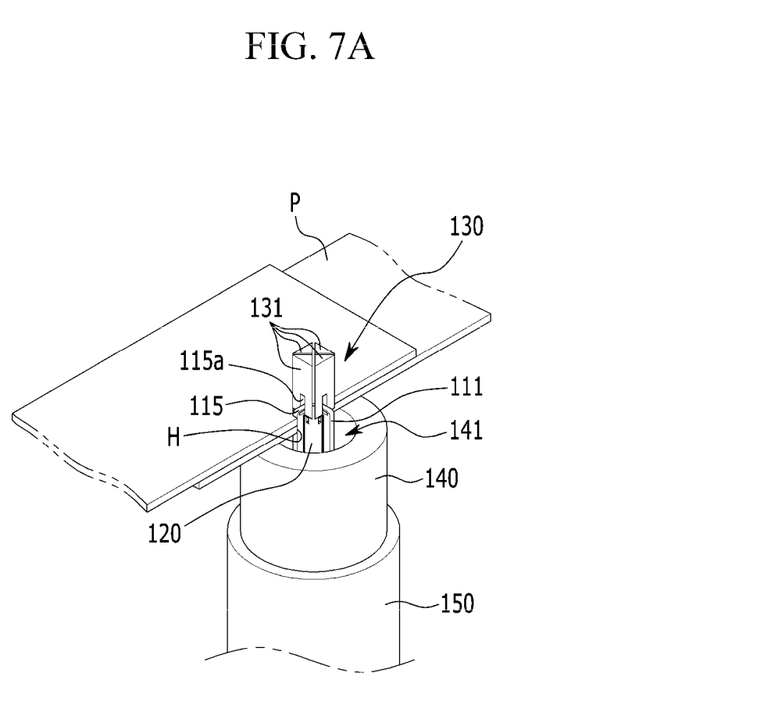
FIGS. 7A and 7B are views illustrating states in which the one-side spot welding device according to another exemplary embodiment of the present disclosure operates.
Figure 7B:
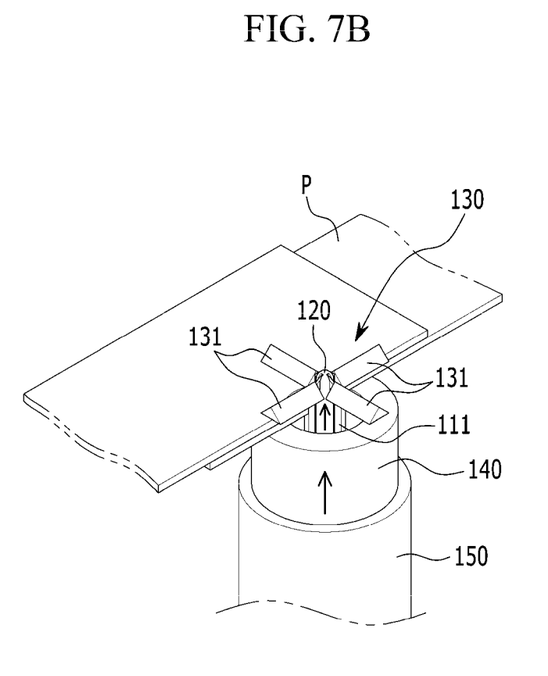
Figure 8:
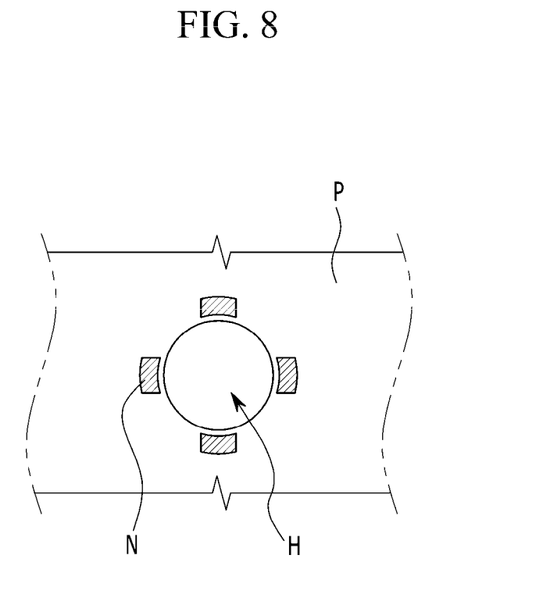
FIG. 8 is a view illustrating a shape of a nugget welded by using the one-side spot welding device according to another exemplary embodiment of the present disclosure.

FIG. 5 is a schematic configuration view of a one-side spot welding device according to another exemplary embodiment of the present disclosure. FIG. 6 is a cross-sectional view taken along line A-A of FIG. 5. FIGS. 7A and 7B are views illustrating states in which the one-side spot welding device according to another exemplary embodiment of the present disclosure operates. FIG. 8 is a view illustrating a shape of a nugget welded by using the one-side spot welding device according to another exemplary embodiment of the present disclosure.

Referring to FIGS. 5 and 6, a spot welding device 100 according to another exemplary embodiment of the present disclosure includes a base 110, a welding head 130, and a welding tip 140.

First, the welding tip 140 is formed in a cylindrical shape having a through hole 141 therein.

The welding tip 140 may apply welding electric current to the welding head 130.

Here, because a configuration for applying welding electric current to the welding tip 140 is a widely and publicly known configuration, a detailed description thereof will be omitted from the present specification.

The welding tip 140 may operate by moving in an upward or a downward direction by a cylinder 150 configured at a lower side thereof.

A fixing end 143, which protrudes toward a center of the welding tip 140, is formed at one side of an inner circumferential surface of the through hole 141 of the welding tip 140.

A lower end portion of the base 110 may be fixed to the fixing end 143.

A push rod 120 is formed at a center of the base 110 so as to be operable by moving in an upward or a downward direction.

Here, the base 110 may include four unit bases 111 separated in a circumferential direction.

A catching end 115 may be formed at each of the upper end portions of the unit bases 111.

Meanwhile, in the present exemplary embodiment, the four unit bases 111 formed in a radial direction are described, but the present disclosure is not limited thereto. The number of the unit bases 111 may be changed.

In the present exemplary embodiment, the push rod 120 may operate by moving in an upward or a downward direction by action of the cylinder 150 configured at the lower side thereof.

A stopper 123 is configured at a lower end portion of the push rod 120.

When the push rod 120 moves upward, the stopper 123 is caught by a lower end of the fixing end 143. As a result, the push rod 120 is prevented from further moving upward to a predetermined height or higher.

Meanwhile, the cylinder 150 includes two chambers C1 and C2.

First, the first chamber C1 imparts pneumatic pressure to a lower end of the push rod 120. Further, the second chamber C2 is defined by a partition wall 151 outside the first chamber C1, and imparts pneumatic pressure to a lower end of the welding tip 140.

Therefore, the push rod 120 and the welding tip 140 may operate by moving in an upward or a downward direction by being selectively supplied with pneumatic pressure from the cylinder 150 configured as described above.

Further, the welding head 130 includes a plurality of unit welding heads 131 connected through the catching ends 115 at upper portions of the unit bases 111.

The unit welding heads 131 are formed by quadrisecting the welding head 130 in the circumferential direction, and may be radially spread as a result of the operation of the push rod 120.

Here, a catching groove 115a is formed at a lower side of each of the unit welding heads 131. That is, the catching groove 115a is hingedly fastened to the catching end 115 through a hinge pin 134. As a result, the unit welding head 131 may be rotatably connected to the unit base 111.

Meanwhile, a fastening end 132, which is directed toward the push rod 120, is formed at a lower end of each of the unit welding heads 131.

The fastening ends 132 are hingedly fastened to the push rod 120 through the hinge pins 134 so that the unit welding heads 131 may be radially spread apart with respect to the base 110.

Therefore, when the push rod 120 operates and moves in an upward direction, the unit welding heads 131 of the welding head 130 may be radially spread apart while being rotated with respect to the unit bases 111.

Hereinafter, an operation of the one-side spot welding device 100 according to another exemplary embodiment of the present disclosure will be described.

When joining a plurality of panels P by using the one-side spot welding device 100, the welding head 130 is inserted into welding holes H formed in the plurality of panels P, as illustrated in FIG. 7A.

Thereafter, as illustrated in FIG. 7B, the push rod 120 operates by moves in an upward direction toward the welding head 130, thereby radially rotating the respective unit welding heads 131.

Therefore, the respective unit welding heads 131 are rotated with respect to the push rod 120 via hinge pins 134, and spread apart in the radial direction.

In this case, the push rod 120 is continuously supplied with pneumatic pressure through the first chamber C1 of the cylinder 150.

Thereafter, when pneumatic pressure is supplied into the second chamber C2 of the cylinder 150, the welding tip 140 moves in an upward direction toward the welding head 130, and presses the panels P positioned between the welding head 130 and the welding tip 140, as illustrated in FIG. 7B.

In this case, the welding tip 140 is continuously supplied with pneumatic pressure through the second chamber C2 until the welding work is completed. Therefore, the welding tip 140, together with the welding head 130, may impart pressing force (welding force) to the panels P.

When welding electric current is applied to the welding tip 140 in this case, the panels P, which are superimposed and positioned between the welding head 130 and the welding tip 140, are welded to each other by electrical resistance heat.

When the operation of the one-side spot welding device 100 is completed, the panels P are joined together and a nugget N is formed at a position of the panels P at which electric current is applied with the welding tip 140 when the unit welding heads 131 are spread apart in the radial direction, as illustrated in FIG. 8.

The shape of the nugget may be changed in accordance with the designed shapes of the welding head 130 and the welding tip 140.

When the welding work is completed, the supply of pneumatic pressure into the first and second chambers C1 and C2 of the cylinder 150 is stopped, and the push rod 120 and the welding tip 140 are moved in a downward direction.

The unit welding heads 131 are then rotated back to an initial position in by the push rod 120 moving in a downward direction. Therefore, the welding work is completed as an operator or a robot removes the welding head 130 from the welding holes H.

Accordingly, the one-side spot welding devices 1 and 100 according to the exemplary embodiments of the present disclosure may improve workability by welding a vehicle body panel P, which has a closed cross section and thus cannot be welded by bidirectional spot welding, by imparting pressing force, forming electrical resistance by applying electric current, and using welding heat produced by the electrical resistance.

Further, the welding is performed by changing a shape of a nugget by changing shapes and structures of the welding heads 30 and 130 and the welding tips 40 and 140. As a result, it is possible to improve welding quality and marketability.

In addition, according to the exemplary embodiments of the present disclosure, a spot welding gun in the related art may be used after applying the bases 10 and 110, the welding heads 30 and 130, and the welding tips 40 and 140 to the spot welding gun. As a result, it is possible to reduce costs.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A one-side spot welding device comprising:
a base formed in a cylindrical shape, having a push rod operable in an upward and a downward direction with respect to the base, and having a slide groove in an upper inner circumferential surface thereof;
a welding head installed at an upper side of the base so as to be slidable in a radial direction, the welding head including a plurality of unit welding heads that are formed by equally dividing the welding head in a circumferential direction and are in close contact with one another, the unit welding heads capable of being spaced apart from one another in the radial direction with operation of the push rod; and
a welding tip formed in a cylindrical shape so as to be mounted on a lower outer circumferential surface of the base, and capable of applying welding electric current to the welding head.

2. The one-side spot welding device of claim 1, wherein:
a cam driving surface having a circular truncated conical shape, and formed at an upper end portion of the push rod.

3. The one-side spot welding device of claim 2, wherein:
each of the unit welding heads is formed with a cam surface having an inclined curved surface at an inner surface, which is in contact with the cam driving surface, so as to perform a cam operation with respect to the cam driving surface.

4. The one-side spot welding device of claim 1, wherein:
the welding head is trisected in the circumferential direction, and has three unit welding heads that are capable of being spaced apart from one another in the radial direction upon operation of the push rod.

5. The one-side spot welding device of claim 1, wherein:
a slide protrusion is formed at a lower side of each of the unit welding heads corresponding to the slide groove, the slide protrusion being slidable in the radial direction with respect to the base when the slide protrusion is inserted into the slide groove.

6. The one-side spot welding device of claim 1, wherein:
a ring groove is formed around an outer circumferential surface of the welding head.

7. The one-side spot welding device of claim 6, wherein:
a spring ring is mounted to the ring groove so as to couple the respective unit welding heads.

8. The one-side spot welding device of claim 1, wherein:
the push rod and the welding tip are capable of moving in an upward and a downward direction by the operation of a cylinder disposed at a lower side thereof, and
the cylinder includes:
a first chamber that imparts pneumatic pressure to a lower end of the push rod; and
a second chamber that is defined by a partition wall outside the first chamber, and imparts pneumatic pressure to a lower end of the welding tip.

9. A one-side spot welding device comprising:
a welding tip having a through hole formed therein and capable of applying welding electric current;
a base fixed to one side of the through hole inside the welding tip, having a push rod operable to move in a upward and a downward direction at a center thereof, and having a catching end formed at an upper end portion thereof; and
a welding head including a plurality of unit welding heads formed by equally dividing the welding head in a circumferential direction, connected to the catching ends, and capable of being radially spread apart upon operation of the push rod.

10. The one-side spot welding device of claim 9, wherein:
a fixing end protruding toward a center of the welding tip and formed at one side of an inner circumferential surface of the through hole of the welding tip.

11. The one-side spot welding device of claim 10, wherein:
a lower end portion of the base is fixed to the fixing end.

12. The one-side spot welding device of claim 9, wherein:
the base includes a plurality of unit bases separated in the circumferential direction, each unit base having an upper end portion on which the catching end is formed.

13. The one-side spot welding device of claim 9, wherein:
the welding head is quadrisected in the circumferential direction, and includes four unit welding heads that are capable of being separated in a radial direction.

14. The one-side spot welding device of claim 13, wherein:
a catching groove is formed at a lower side of each of the unit welding heads, the catching groove being hingedly fastened to the catching end through a hinge pin.

15. The one-side spot welding device of claim 13, wherein:
a fastening end is formed at a lower end of each of the unit welding heads so as to be directed toward the push rod, the fastening end being hingedly fastened to the push rod through a hinge pin so that the unit welding heads are capable of being radially spread apart with respect to the base.

16. The one-side spot welding device of claim 9, wherein:
the push rod and the welding tip are capable of moving in an upward and a downward direction by operation of a cylinder disposed at a lower side thereof, and
the cylinder includes:
a first chamber that imparts pneumatic pressure to a lower end of the push rod; and
a second chamber that is defined by a partition wall outside the first chamber, and imparts pneumatic pressure to a lower end of the welding tip.

* * * * *